US010536105B2

(12) United States Patent
Tobayashi et al.

(10) Patent No.: US 10,536,105 B2
(45) Date of Patent: Jan. 14, 2020

(54) POWER CONVERSION APPARATUS

(71) Applicant: Toshiba Mitsubishi-Electric Industrial Systems Corporation, Chou-ku (JP)

(72) Inventors: Shunsuke Tobayashi, Tokyo (JP); Toshiaki Oka, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 15/959,691

(22) Filed: Apr. 23, 2018

(65) Prior Publication Data

US 2018/0241338 A1 Aug. 23, 2018

Related U.S. Application Data

(63) Continuation of application No. PCT/JP2016/070906, filed on Jul. 14, 2016.

(30) Foreign Application Priority Data

Oct. 23, 2015 (JP) ................................ 2015-208872

(51) Int. Cl.
*H02P 29/028* (2016.01)
*H02P 29/024* (2016.01)
(Continued)

(52) U.S. Cl.
CPC ............ *H02P 29/028* (2013.01); *H02M 1/32* (2013.01); *H02P 27/08* (2013.01); *H02P 29/026* (2013.01);
(Continued)

(58) Field of Classification Search
CPC .......... H02P 29/028; H02P 3/00; H02P 7/292; H02P 11/00; H02P 3/18; H02P 27/06; H02M 1/32
See application file for complete search history.

(56) References Cited

U.S. PATENT DOCUMENTS 7,091,690 B1 * 8/2006 Oka ........................ H02P 1/029 318/727
8,097,971 B2 1/2012 Ichinose et al.
(Continued)

FOREIGN PATENT DOCUMENTS

JP 60-139186 A 7/1985
JP 6-121548 A 4/1994
(Continued)

OTHER PUBLICATIONS

International Search Report dated Sep. 27, 2016 in PCT/JP2016/070906 filed Jul. 14, 2016 (with English Translation).
(Continued)

*Primary Examiner* — Bickey Dhakal
*Assistant Examiner* — Said Bouziane
(74) *Attorney, Agent, or Firm* — Oblon, McClelland, Maier & Neustadt, L.L.P.

(57) ABSTRACT

A power conversion apparatus having a converter, an inverter controlled by inverter controller, and an input power source fluctuation detecting and controlling circuit is proposed. The input power source fluctuation detecting and controlling circuit includes an input power source fluctuation detector and a converter failure detector to detect overcurrent and/or overvoltage of the converter. When both of the input power source fluctuation and the converter failure are detected, the converter is gate blocked, and the inverter continues its operation, and when the DC voltage become lower than a threshold voltage during the converter is gate blocking, the input power source fluctuation detecting and controlling circuit outputs an inverter control changeover flag to the inverter controller for switching a contents of inverter control.

7 Claims, 3 Drawing Sheets

(51) Int. Cl.
*H02P 29/032* (2016.01)
*H02M 1/32* (2007.01)
*H02P 27/08* (2006.01)

(52) U.S. Cl.
CPC ........ *H02P 29/027* (2013.01); *H02P 29/0241* (2016.02); *H02P 29/032* (2016.02); *H02M 2001/325* (2013.01)

(56) References Cited

U.S. PATENT DOCUMENTS

| | | | | |
|---|---|---|---|---|
| 2013/0094258 | A1* | 4/2013 | Royak | H02M 1/32 363/89 |
| 2013/0229052 | A1* | 9/2013 | Kitanaka | B60L 3/003 307/9.1 |

FOREIGN PATENT DOCUMENTS

| | | |
|---|---|---|
| JP | 2007-049798 | 2/2007 |
| JP | 2009-273281 | 11/2009 |
| JP | 2013-110830 | 6/2013 |
| JP | 2013-115914 | 6/2013 |
| WO | WO 2015/156003 A1 | 10/2015 |

OTHER PUBLICATIONS

Extended European Search Report dated May 22, 2019 in Patent Application No. 16857139.6, citing documents AO-AQ therein, 8 pages.

* cited by examiner

POWER CONVERSION APPARATUS

CROSS-REFERENCE TO RELATED APPLICATION

This application is based upon and claims the benefit of priority from the prior Japanese Patent Application No. 2015-208872, filed on Oct. 23, 2015, the entire contents of which are incorporated herein by reference.

FIELD

The embodiment of the present invention relates to the power conversion apparatus in which a continuous operation of an inverter is possible at the time of an input power source fluctuation.

BACKGROUND ART

For example, when an input voltage of a drive equipment such as an inverter changed according to the input power source fluctuation, an output of PWM converter may generally result in overcurrent or overvoltage. This is because PLL control of a converter output voltage cannot be followed to the input power source fluctuation.

In a PWM converter, when PLL control becomes unusual, the converter output and the inverter output are used to suspend with the gating signal (hereinafter, a gate block is called) like a case when general momentary power failure occurred. And when the input power source fluctuation is eliminated, the converter and the inverter are restarted. Proposals have been made to prevent a DC overvoltage and to continue an operation of the converter. (For example, refer to Patent documents 1).

PATENT DOCUMENT

Patent document 1: Japanese Patent Application Publication No. 2009-273281

SUMMARY OF THE INVENTION

Problem to be Solved by the Invention

However, by a method given in the patent document mentioned above, other equipment is needed in case of a system accident, such as an overcurrent consumption equipment. Moreover, the method does not perform suitable control with the inverter.

The present invention is made in order to solve the subject mentioned above. The present invention makes it an object to provide a power conversion apparatus in the case where PLL control becomes unusual according to the input power source fluctuation etc., avoiding overcurrent and overvoltage of the converter by carrying out the gate block of the converter, operating an inverter continuously by reducing torque current, and keeping DC voltage and field flux, or to provide a power conversion apparatus to keep a motor speed by a field weakening in which DC voltage is limited on the peak of diode rectification.

Means for Solving the Problem

In order to achieve the above-mentioned purpose, the power conversion apparatus of the present invention has a converter (CNV) which converts AC power to DC power, an inverter (INV) which converts the DC power to AC power, an input power source fluctuation detecting and controlling circuit, the input power source fluctuation detecting and controlling circuit which is composed of an input power source fluctuation detector and a converter failure detector to detect overcurrent and/or overvoltage of the converter, wherein, when input power source fluctuation is detected by the input power source fluctuation detector and a converter failure is detected by the converter failure detector, the converter is gate blocked, and the inverter continues its operation, and when the DC voltage become lower than a threshold voltage during the converter is gate blocking, the input power source fluctuation detecting and controlling circuit outputs an inverter control changeover flag to the inverter controller for switching a contents of inverter control.

Effects of the Invention

According to the present invention, an operation of the inverter can be continued, by reducing the torque current of the inverter and keeping DC voltage and field flux, avoiding overcurrent and overvoltage of the converter by carrying out a gate block of the converter power output, at the time of the input power source fluctuation detection.

EMBODIMENT TO PRACTICE THE INVENTION

Hereinafter, embodiment of the present invention will be described with reference to the drawings.

Embodiment 1

Figure 1:
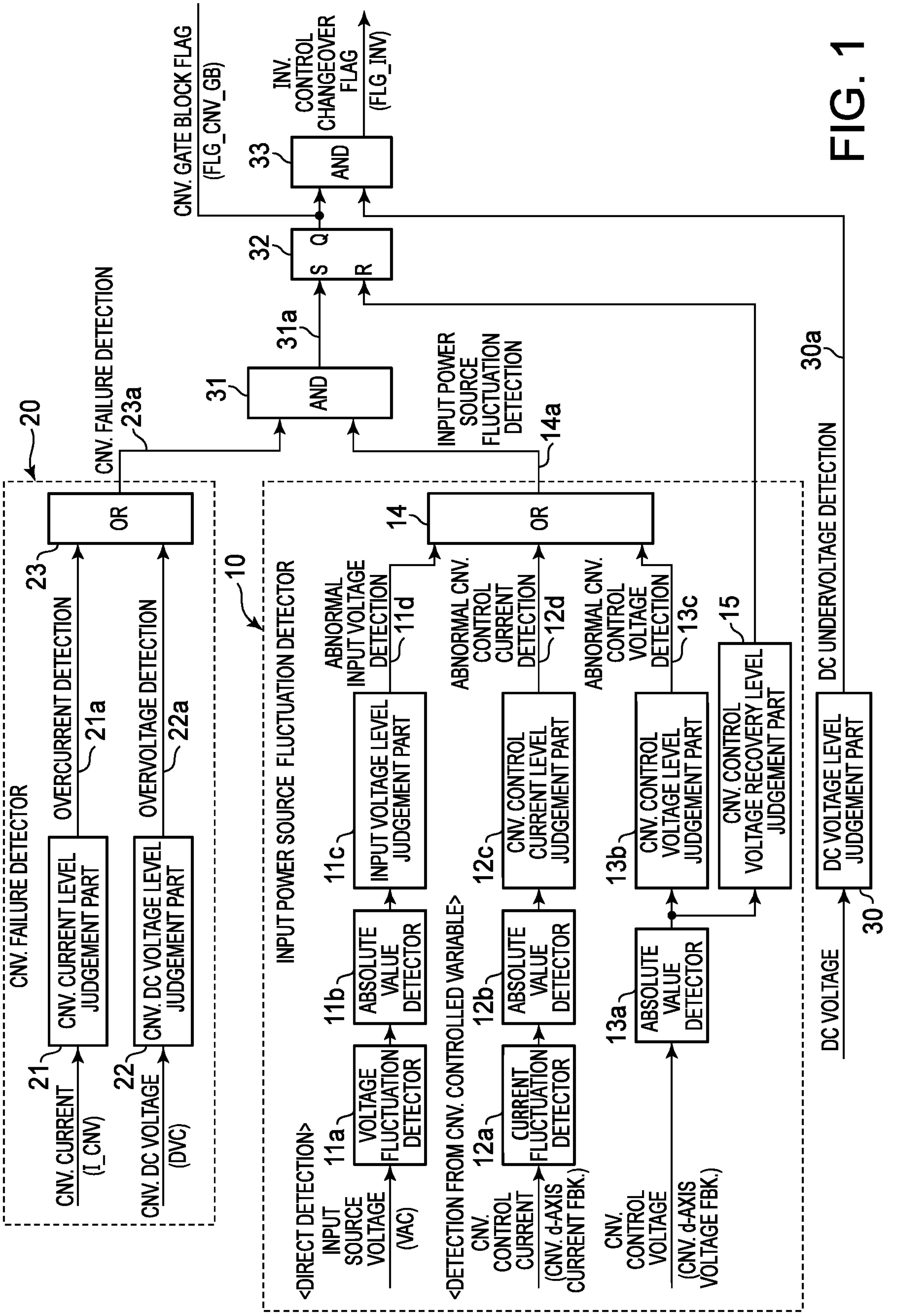
FIG. 1 A block diagram of an input power source fluctuation detecting and controlling circuit for detecting the input power source fluctuation in the case of the embodiment 1.

FIG. 1 is a block diagram of the input power source fluctuation detecting and controlling circuit for detecting the input power source fluctuation, and for outputting necessary signals to the converter and the inverter in the case of the embodiment 1. Hereinafter, (1) an input power source fluctuation detector, (2) a converter (CNV) failure detector, (3) a power supply fluctuation recovery detector, and (4) a necessary condition of functional operation, will be described using this block diagram.

(1) The Input Power Source Fluctuation Detector

The input power source fluctuation detector 10 as an input power source fluctuation detection means is equipped with a circuit to detect change of an input power source directly, and a circuit to detect the input power source fluctuation by converter controlled variables (CNV controlled variables).

(A Circuit to Detect a Variation of Input Power Source Directly)

The circuit (the 1st means) to detect a variation of input power source directly is composed of a voltage fluctuation detector 11*a* which detect a variation of input power source voltage (VAC), an absolute value detector 11_b_, and an input voltage level judgment part 11_c_.

The voltage fluctuation detector 11_a_ detects a variation of input power source voltage using the derivative element of input voltage, and outputs the detected voltage variation to the absolute value detector 11_b_. A detection procedure and an absolute value detecting method of the above-mentioned voltage variation are well-known technologies, so it has omitted the detailed explanation here.

The absolute value detector lib computes the absolute value of the voltage variation inputted from the voltage fluctuation detector 11_a_, and outputs the computed absolute value to the input voltage level judgment part 11_c_. The input voltage level judgment part 11_c_ compares the absolute value of an input voltage variation inputted from the absolute value detector lib with an input voltage variation detection level. When the absolute value of voltage variation exceeds the input voltage variation detection level as a result of this comparison, it is regarded that the fluctuation of input voltage (VAC) is detected, and an abnormal input voltage detection signal 11_d_ (for example, 1 (H level)) is outputted. The abnormal input voltage detection signal 11_d_ outputted from input voltage level judgment part 11_c_ is inputted to an OR circuit 14.

The OR circuit 14 receives the input of the abnormal input voltage detection signal 11_d_, regards it as the input power source fluctuation is detected, and outputs an input power source fluctuation detection signal 14_a_. The input power source fluctuation detection signal 14_a_ is inputted to one terminal of AND circuit 31.

When an abnormalities in the converter mentioned later are detected by a CNV failure detector 20, a converter failure detection signal 23_a_ is inputted into the terminal of another side of the AND circuit 31. Therefore, when the input power source fluctuation detection signal 14_a_ is outputted and the CNV failure detection signal 23_a_ mentioned above is also outputted, a AND circuit 31 outputs the input power source fluctuation detection signal 31_a_ to a flip-flop 32. Then the flip-flop 32 is set, and a CNV gate block flag (FLG_CN-V_GB) is outputted from the output terminal Q of the flip-flop 32. The flip-flop 32 carry out CNV gate block during the period when the CNV gate block flag (FLG_C-NV_GB) is outputted from the output terminal Q of the flip-flop 32. The CNV gate block flag (FLG_CNV_GB) is inputted into one terminal of an AND circuit 33.

When the abnormalities in DC voltage (for example, DC under-voltage) mentioned later are detected by a DC voltage level judgment part 30, a DC under-voltage detection signal 30_a_ will be outputted from the DC voltage level judgment part 30, and it will be inputted into another terminal of the AND circuit 33.

When the flip-flop 32 is set and the CNV gate block flag (FLG_CNV_GB) is being output as a result of output of above-mentioned input power source fluctuation detection signal 14_a_ and the CNV failure detecting signal 23_a_, and when the above-mentioned DC under-voltage detection signal 30_a_ is outputted from the DC voltage level judgment part 30 and inputted to the AND circuit 33, then an INV control change flag (FLG_INV) is outputted from the output terminal of the AND circuit 33. During the period when the INV control change flag (FLG_INV) is outputted from the output terminal of the AND circuit 33, the inverter carries out continuous operation and performs field weakening or torque reduction, in spite of the gate block of the converter.

(A Means to Detect by a CNV Controlled Variable)

The converter converts an AC power supply as an input power source to a DC power supply. Therefore, the input power source fluctuation is detectable by detecting the variation of input power source directly as having mentioned above. On the other hand, there is a means to detect by the converter controlled variable which controls the converter, when the input power source fluctuation occurred.

There are two detection means using converter controlled variables. One is to detect a variation of converter control current which detects abnormalities of converter control current (the 2nd means), the other is to detect a variation of converter control voltage which detects abnormalities of converter control voltage (the 3rd means). A means (the 2nd means) to detect the variation of converter control current is composed of a current fluctuation detector 12_a_, an absolute value detector 12_b_, a converter control current level judgment part (CNV control current level judgment part) 12_c_. As converter control current (CNV control current), there is converter d-axis current feedback (CNV d-axis current FBK), for example. Converter d-axis current is orthogonal phase current to the power source voltage phase, when a CNV input current is converted to d-axis and q-axis.

The current fluctuation detector 12_a_ compares the CNV d-axis current FBK with a converter d-axis current reference (not shown). The current fluctuation detector 12_a_ detects the current variation, and outputs it to the absolute value detector 12_b_. The absolute value detector 12_b_ computes the absolute value of the current variation inputted from the current fluctuation detector 12_a_, and outputs it to the CNV control current level judgment part 12_c_.

The CNV control current level judgment part 12_c_ compares the absolute value of the current variation inputted from the absolute value detector 12_b_ with a CNV control current detection level (not shown). When the absolute value of current variation exceeds the CNV control current detection level as a result of this comparison, it is regarded as that a CNV control current fluctuation is detected, and an abnormal CNV control current detection signal 12_d_ (for example, 1 (H level)) is outputted to the OR circuit 14.

When the OR circuit 14 receives the abnormal CNV control current detection signal 12_d_, the OR circuit 14 regards it as the input power source fluctuation is detected, and outputs an input power source fluctuation detection signal 14_a_. The input power source fluctuation detection signal 14_a_ is inputted into one terminal of an AND circuit 31.

A means (the 3rd means) to detect the variation of converter control voltage is composed of an absolute value detector 13_a_, a converter control voltage level judgment part 13_b_. As converter control voltage (CNV control voltage), there is converter d-axis voltage feedback (CNV d-axis voltage FBK), for example. Converter d-axis voltage is an orthogonal phase voltage to a power source voltage phase, when CNV input voltage is converted to d-axis and q-axis. In the PLL control mentioned above, basis phase of the two axis conversion is determined so that the d-axis voltage becomes to be zero. Therefore when the input power source fluctuation occurred, the d-axis current FBK and the d-axis voltage FBK generate since the PLL control becomes unstable. The absolute value detector 13_a_ computes an absolute value of inputted CNV d-axis voltage FBK, and outputs it to the CNV control voltage level judgment part 13_b_.

The CNV control voltage level judgment part 13_b_ compares an absolute value of the CNV d-axis voltage FBK inputted from the absolute value calculation part 13_a_, with a CNV control voltage detection level (not shown). When the absolute value of the CNV control voltage exceeds the CNV control voltage detection level as a result of this comparison, it is regarded as that a CNV control voltage fluctuation is detected, and an abnormal CNV control voltage detection signal 13*c* (for example, 1 (H level)) is outputted. The abnormal CNV control voltage detection signal 13*c* outputted from the CNV control voltage level judgment part 13*b* is inputted into the OR circuit 14.

The operation after the input power source fluctuation is detected by the input power source fluctuation detector 10 is as having mentioned above.

(2) A Converter Failure Detector

A converter failure detection part 20 has a converter current level judgment part (CNV current level judgment part) 21 and a converter DC voltage level judgment part (CNV DC voltage level judgment part) 22. The CNV current level judgment part 21 compares a CNV current (I_CNV) with a converter current reference (a CNV current reference, not shown). When the CNV current exceeds the CNV current reference as a result of this comparison, it is regarded that an overcurrent is detected, and an overcurrent detection signal 21*a* is outputted. The overcurrent detection signal 21*a* is inputted into an OR circuit 23.

When the overcurrent detection signal 21*a* is inputted from the CNV current level judgment part 21, the OR circuit 23 regards it as the overcurrent in a converter are detected, and outputs the CNV failure detection signal 23*a*.

The CNV DC voltage level judgment part 22 compares the CNV DC voltage (VDC) with a converter DC voltage reference (a CNV DC voltage reference, not shown). When the CNV DC voltage exceeds the CNV DC voltage reference as a result of this comparison, it is regarded that an overvoltage is detected, and an overvoltage detection signal 22*a* is outputted. The overvoltage detection signal 22*a* is inputted into the OR circuit 23. When the overvoltage detection signal 22*a* is inputted from the CNV DC voltage level judgment part 22, the OR circuit 23 regards it as the overvoltage in a converter are detected, and outputs the CNV failure detection signal 23*a*.

(3) A Power Supply Fluctuation Recovery Detector

It is judged by the CNV control voltage recovery level judgment part 15 whether the power supply is normal or the power supply fluctuation mentioned above is returned normally. A CNV control voltage recovery level judgment part 15 compares the absolute value of the CNV d-axis voltage FBK outputted from the absolute value calculation part 13*a*, with a CNV control voltage recovery level (not shown). When the CNV d-axis voltage FBK is below the CNV control voltage recovery level as a result of this comparison, the flip-flop circuit 32 is reset since it is regarded that the power supply is normal or the power supply fluctuation is returned normally. In this case, in order to prevent the chattering of control when the power supply fluctuation is recovered only for a short time and the fluctuation of power supply generates again, a time delay factor may be added into the judgment.

(4) Necessary Condition of Functional Operation

Necessary condition for setting the CNV gate block flag (FLG_CNV_GB) and the inverter control changeover flag (FLG_INV) is a case where a CNV current (I_CNV) turns into overcurrent, or a case where a CNV DC voltage (VDC) turns into overvoltage. In configuration of the present application, the gate block (stop) of the converter is not carried out only by detecting the fluctuation of an input power source, but it becomes over-current or over-voltage only when the gate block is carried out during the power supply fluctuation is detected. Since malfunction by incorrect detection is prevented and the possibility of continued operation as a power supply system is made to improve by this, a condition concerned is called the necessary condition of functional operation.

The flip-flop circuit 32 is set under predetermined requirements when AND conditions are satisfied by above-mentioned AND circuit 31, and the power supply fluctuation by which the functional operation necessary condition mentioned above is fulfilled is detected, and the power supply fluctuation detection signal 31*a* is outputted from the AND circuit 31. Above-mentioned predetermined requirements are that it is regarded as the power supply fluctuation is continuing, and a terminal R of the flip-flop 32 is released, when the absolute value of the CNV d-axis voltage FBK is not detected by the CNV control voltage recovery level judgment part 15. When this requirement is satisfied and the above-mentioned power supply fluctuation detection signal 31*a* is outputted, the power supply fluctuation is able to be detected.

By the CNV gate block flag (FLG_CNV_GB) which is an output of the flip-flop circuit 32, the gate block of the converter is carried out and the abnormalities of overcurrent and overvoltage are avoided. Moreover, the converter continues operation by diode rectification even while the converter is gate blocked, and the inverter continues its operation similarly.

Figure 2:
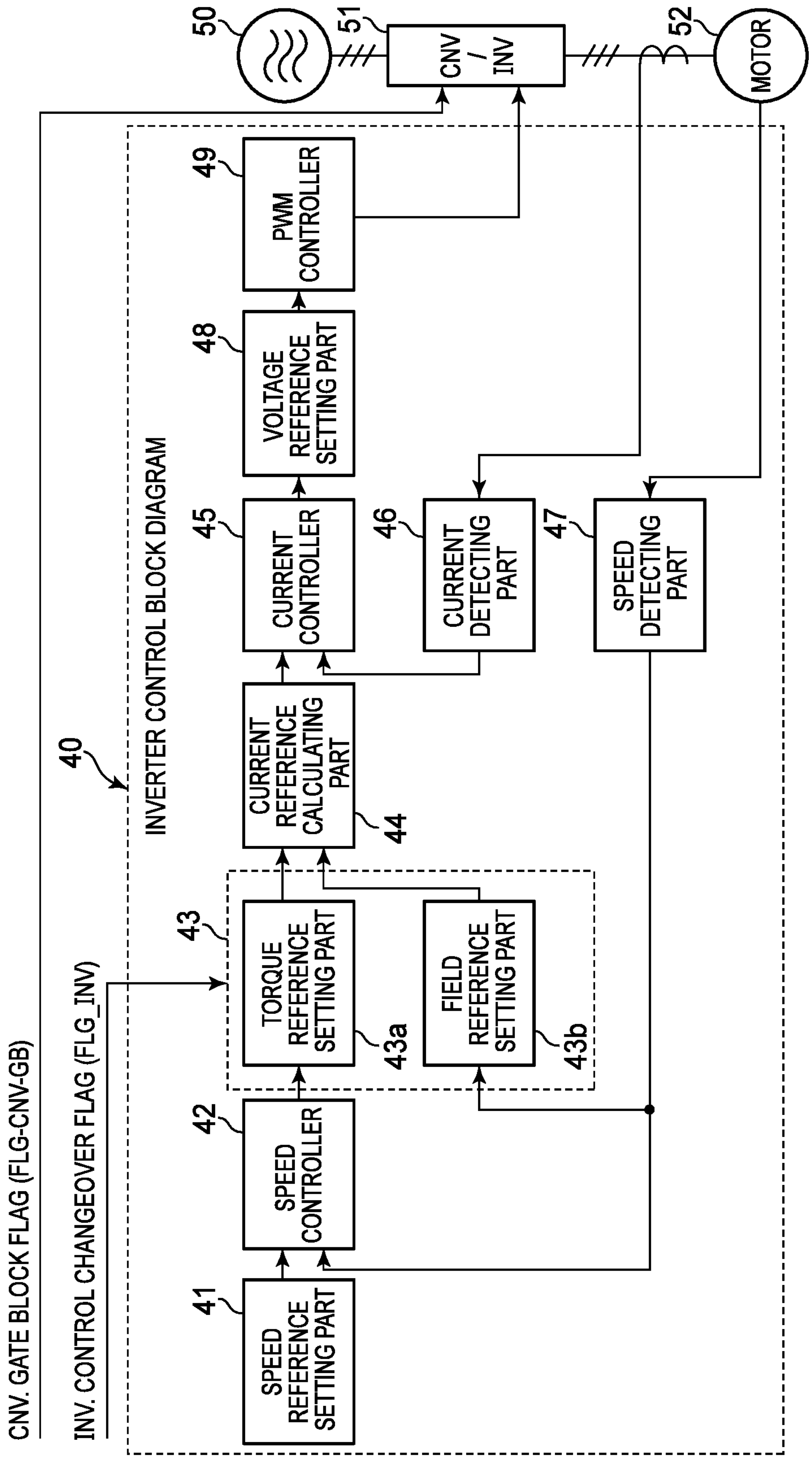
FIG. 2 A block diagram explaining the inverter control using the inverter control changeover flag outputted at the time of the input power source fluctuation detection concerning with FIG. 1.

FIG. 2 is a block diagram explaining the inverter control using the inverter control change flag (FLG_INV) outputted at the time of the input power source fluctuation concerning with FIG. 1, and it will be explained also referring to FIG. 1. A rotating speed of the motor 52 is detected by a speed detector 47, and is inputted into a speed controller 42. The speed controller 42 controls the rotating speed of the motor 52 in the permitted range set up in a speed reference setting part 41, by comparing the rotating speed detected by the speed detecting part 47 with a speed set up in the speed reference setting part 41.

When a power failure is detected by the power supply fluctuation explained in FIG. 1, and when DC voltage falls, the INV control change flag (FLG_INV) outputted from the AND circuit 33 is inputted into a torque and the field reference setting part 43 during a period of that the motor 52 is controlled by the speed controller 42 so that the rotating speed is controlled to meet with the setting speed reference by the speed reference setting part 41. When the INV control change flag is inputted and above-mentioned power failure is detected, the torque and the field reference setting part 43 operate a torque reference and a field reference to carry out a continuous operation of the motor 52 as long as possible.

A torque reference setting part 43*a* sets up a torque reference for driving the motor 52. For example, in a torque reduction control which reduces torque, the torque reference is reduced to keep or increase DC voltage (VDC) (refer to FIGS. 3 (4) and (F)).

A field reference setting part 43*b* sets up a field reference for driving the motor 52. For example, in the field weakening control, when a modulation factor has reached saturation (FIG. 3 (3), (D)), weakens a field flux to reduces the modulation factor and releasing saturation, then restores the field flux gradually (refer to FIG. 3 (3), (D), (E)).

For example, when the gate block of the CNV is carried out and DC voltage falls during the period while the INV control change flag (FLG_INV) signal is outputted, the modulation factor may increase and it may reach saturation. In this case of the operation, in order to prevent this, the following is performed. The field reference setting part 43*b* performs a setup which weakens the field flux of the motor 52 with the fall of DC voltage. Thereby (field weakening control, FIG. 3 (3)), above-mentioned modulation factor is made to increase gently (FIGS. 3 (3), (D)), and makes it possible to hold the rotating speed, field flux, and torque of a motor in the tolerance range for a longer time.

The torque reduction control and the field weakening control which are mentioned above can be performed by combining either or both. The purpose of these control permits the fall of the DC voltage (VDC) within tolerance level, keeps the field flux to make rapid control at the time of the power fluctuation recovery, and keeps motor speed by a request of motor load, and continues operation of the motor 52 in possible time range.

The field reference set up in the field reference setting part 43*b* and the torque reference set up in the torque reference setting part 43*a* are inputted into a current reference calculating part 44.

The current reference calculating part 44 performs calculation for continuing operation mentioned above, based on the torque reference and the field reference having been inputted, and sets up a current reference, and inputs it into a current controller 45. The current controller 45 compares the current of the motor 52 detected by the current detecting part 46 with the current reference set up by the current reference calculating part 44. The comparative result is inputted into a voltage reference setting part 48. The voltage reference setting part 48 sets up a voltage reference based on the comparative result inputted from the current controller 45, and inputs it into a PWM controller 49.

The PWM controller 49 sets up a pulse width, a number of pulses, etc. based on the voltage reference inputted from the voltage reference setting part 48, and inputs them into a CNV/INV 51. The CNV (converter)/INV (inverter) 51 carry out following operations, based on the pulse width, the number of pulses, etc. which are inputted from the PWM controller 49. A CNV part of CNV/INV 51 generates a DC electric power from an AC electric power outputted by a generator 50, and an INV part of CNV/INV 51 generates an AC electric power required to drive the motor 52 from the DC electric power.

The CNV gate block flag (FLG_CNV_GB) is inputted into the CNV/INV 51 from the flip-flop 32. As mentioned above, when the CNV gate block flag is set, only the converter (CNV) performs gate-block, although inverter performs its continuous operation.

Figure 3:
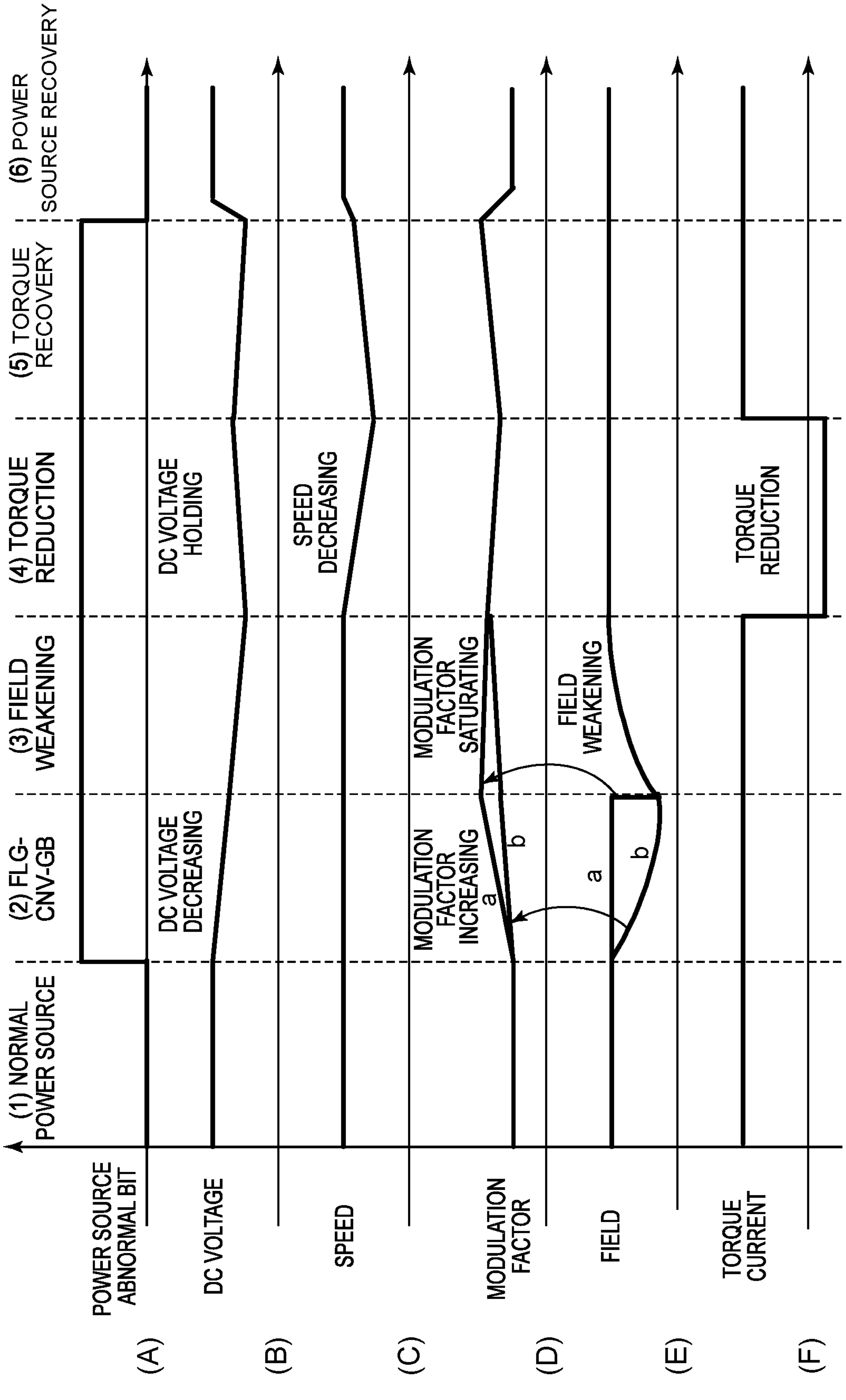
FIG. 3 A timing chart explaining the inverter control at the time of the input power source fluctuation detection concerning with FIG. 2.

FIG. 3 is a typical timing chart explaining the inverter control at the time of the input power source fluctuation detection concerning with FIG. 2. Hereinafter, each performance which can be carried out at the time of (1) normal power source, (2) (FLG_CNV_GB) ON operation, (3) field weakening operation, (4) torque reduction operation, (5) torque recovery operation, and (6) power source recovery will be explained.

(1) At the Time of Normal Power Source

A power source abnormal bit which is set in the case of power failure at the time of a power supply abnormal performance, is in the reset state ("0" levels). The power source abnormal bit is identical signal with the CNV gate block flag in this embodiment. At the time of normal power supply, it is assumed hereafter that DC voltage, motor speed, a modulation factor, field flux, and torque current are performing stationary behavior as illustrated in FIG. 3.

(2) At the Time of (FLG_CNV_GB) ON Operation

It is in the state (FLG_CNV_GB is "1" level) when the flip-flop 32 is set at the time of (FLG_CNV_GB) ON operation, and it is in the state when the power supply fluctuation is detected. As one of the correspondences in this case, the gate block of the converter is carried out and the method of continuous operation of the inverter is used. FIG. 3 (2) shows operation of this state.

Since the gate block of the converter is carried out at this time, DC voltage falls ((2) (B)). On the other hand, since with the fall of DC voltage a modulation factor increases in inverse proportion ((2) (D) a). When the modulation factor is within a tolerance level, motor speed, field flux, and torque are held in a suitable range ((2) (C), (E) a, (F)). However, the modulation factor becomes to be saturated with increase of it.

A field weakening control can also be carried out using the INV control change flag (FLG_INV), in the case that the DC voltage fall is detected immediately at the time of (FLG_CNV_GB) ON operation. That is, by weakening field flux, in connection with field flux declining gently like the waveform shown in ((2) (E) b), the modulation factor increases gently and it is possible to suppress the saturation of the modulation factor.

(3) Field Weakening Operation

If an under-voltage of DC voltage is detected at the time when the modulation factor is saturated, and field flux is weakened there, it is possible to keep motor speed although a modulation factor is saturated ((3)—(D) a) and DC voltage falls. On the other hand, the modulation factor increases gently by suppressing the saturation of the modulation factor by weakening field flux ((3), (D) b). As a result, even if DC voltage falls, motor speed, field flux, and torque will be held in the suitable range.

(4) Torque Reduction Operation

For example, torque reduction operation as torque current turns to regenerative (FIG. 3 (4), (F)) is done when the under-voltage of DC voltage is detected. Then DC voltage rises gradually ((4), (B)) since torque current turns to regenerative although motor speed falls ((4), (C)). And field flux will be held in the suitable range.

(5) Torque Recovery Operation

When above-mentioned (4) torque reduction operation is stopped, torque will return, increase of DC voltage will stop, DC voltage will fall gradually ((5) (B)), and motor speed will increase ((5) (C)). With the fall of DC voltage, the modulation factor increases ((5) (D)) as mentioned above. If the under-voltage of DC voltage is detected again, then a torque reduction operation will be restarted.

(6) Power Source Recovery

When the power source returns normally, the INV control change flag (FLG_INV) which is an output signal of the AND circuit 18 will be come by off. AS a result, DC voltage ((6) (B)), motor speed ((6) (C)), and the modulation factor ((6) (D)) return to normal status in predetermined time constant of control.

As described above, it is possible to provide a power conversion apparatus, in which the converter can avoid the overcurrent and overvoltage by carrying out the gate block of it, and the inverter can keep continues operation.

DESCRIPTION OF THE SYMBOLS

10 INPUT POWER SOURCE FLUCTUATION DETECTOR
11*a* VOLTAGE FLUCTIATION DETECTOR
11*b* ABSOLUTE VALUE DETECTOR
11*c* INPUT VOLTAGE LEVEL JUDGEMENT PART
12*a* VOLTAGE FLUCTUATION DETECTOR
12*b* ABSOLUTE VALUE DETECTOR
12*c* CONVERTER CONTROL CURRENT LEVEL JUDGEMENT PART
13*a* ABSOLUTE VALUE DETECTOR

13*b* CONVERTER CONTROL VOLTAGE LEVEL JUDGEMENT PART
14 OR CIRCUIT
15 CONVERTER CONTROL VOLTAGE RECOVERY LEVEL JUDGEMENT PART
20 CONVERTER FAILURE DETECTOR
21 CONVERTER CURRENT LEVEL JUDGEMENT PART
22 CONVERTER DC VOLTAGE LEVEL JUDGEMENT PART
23 OR CIRCUIT
30 DC VOLTAGE LEVEL JUDGEMENT PART
31, 33 AND CIRCUIT
32 FLIP-FLOP
41 SPEED REFFERENCE SETTING PART
42 SPEED CONTROLLER
43 TORQUE/FIELD REFFERENCE SETTING PART
44 CURRENT REFFERENCE CALCULATING PART
45 CURRENT CONTROLLER
46 CURRENT DETECTING PART
47 SPEED DETECTING PART
48 VOLTAGE REFFERENCE SETTING PART
49 PWM CONTROLLER
50 GENERATOR
51 CONVERTER AND INVERTER
52 MOTOR

The invention claimed is:

1. A power conversion apparatus having a converter for converting an AC power to a DC power, an inverter for converting the DC power to an AC power controlled by an inverter controller, and an input power source fluctuation detecting and controlling circuit, the input power source fluctuation detecting and controlling circuit comprising:

an input power source fluctuation detector;

a converter failure detector to detect overcurrent and/or overvoltage of the converter;

wherein, when an input power source fluctuation is detected by the input power source fluctuation detector and a converter failure is detected by the converter failure detector, the converter is gate blocked, and the inverter continues its operation, and when the DC voltage is determined to be lower than a threshold voltage while the converter is gate blocked, the input power source fluctuation detecting and controlling circuit outputs an inverter control changeover flag to the inverter controller for switching a contents of inverter control, and the input power fluctuation detector has a first detecting circuit, comprising:

a voltage fluctuation detector to detect a voltage variation of input power source directly;

an absolute value detector to compute an absolute value of the voltage variation inputted from the voltage fluctuation detector;

an input voltage level judgment part which outputs an abnormal input voltage detection signal as it is regarded that the fluctuation of input voltage is detected, when the absolute value of voltage variation exceeds an input voltage variation detection level in comparison of them.

2. The power conversion apparatus according to claim 1, wherein the input power fluctuation detector has a second detecting circuit, comprising:

a current fluctuation detector to detect a variation of the converter d-axis current feedback as converter control current;

an absolute value detector to computes an absolute value of current variation inputted from the current fluctuation detector;

a converter control current level judgment part which outputs an abnormal converter control current detection signal as it is regarded that the fluctuation of converter control current is detected, when the absolute value of control current variation exceeds a control current variation detection level in comparison of them, and, the input power fluctuation detector has a third detecting circuit, comprising:

an absolute value detector to computes an absolute value of the voltage variation of the converter d-axis voltage feedback as converter control voltage;

a converter control voltage level judgment part which outputs an abnormal converter control voltage detection signal as it is regarded that the fluctuation of converter control voltage is detected, when the absolute value of control voltage variation exceeds a control voltage variation detection level in comparison of them.

3. The power conversion apparatus according to claim 2, wherein, the converter gate block is canceled when the absolute value of the voltage variation of the converter d-axis voltage feedback become lower than a converter control voltage recovery level.

4. The power conversion apparatus according to claim 1, wherein, the inverter controller is able to keep motor speed, field flux, and torque in the suitable range, when the converter is gate blocked, since a modulation factor increases with the fall of DC voltage.

5. The power conversion apparatus according to claim 4, wherein, the threshold voltage is the DC voltage when the modulation factor is saturated, and the inverter controller has a field reference setting part to set a field reference for driving a motor, and it keeps the saturated modulation factor and keeps motor speed as long time as possible by field weakening when received the inverter control changeover flag.

6. The power conversion apparatus according to claim 1, wherein, the inverter controller further comprising a field reference setting part, which performs field weakening setting when the inverter control changeover flag is inputted, to increase a modulation factor gently for keeping motor speed, field flux, and torque in the suitable range.

7. The power conversion apparatus according to claim 1, wherein, the inverter controller further comprising a torque reference setting part, which performs torque reduction setting when the inverter control changeover flag is inputted, to keep the DC voltage and to keep the field flux as long time as possible.

* * * * *

UNITED STATES PATENT AND TRADEMARK OFFICE

CERTIFICATE OF CORRECTION

PATENT NO. : 10,536,105 B2
APPLICATION NO. : 15/959691
DATED : January 14, 2020
INVENTOR(S) : Shunsuke Tobayashi et al.

It is certified that error appears in the above-identified patent and that said Letters Patent is hereby corrected as shown below:

On the Title Page

Item (71), the Applicant’s city is incorrect. Item (71) should read:
-- (71) Applicant: Toshiba Mitsubishi-Electric Industrial Systems Corporation, Chuo-ku (JP) --

Signed and Sealed this
Third Day of March, 2020

Andrei Iancu
*Director of the United States Patent and Trademark Office*